United States Patent

Neuman et al.

[11] Patent Number: 5,964,915
[45] Date of Patent: Oct. 12, 1999

[54] MOLD FOR FORMING GLASSWARE

[75] Inventors: Peter Neuman, Wardenburg, Germany; James B. C. Wu, St. Louis, Mo.; Günther Clos, Weyer, Germany

[73] Assignee: Deloro Stellite Company Inc., St. Louis, Mo.

[21] Appl. No.: 09/088,667

[22] Filed: Jun. 2, 1998

[51] Int. Cl.⁶ ............................ C03B 9/197; C03B 9/347; C03B 9/48

[52] U.S. Cl. .................... 65/214; 65/265; 65/356; 65/361; 65/374.1; 65/374.12; 249/80; 249/111; 249/135

[58] Field of Search ............................ 65/374.1, 374.12, 65/361, 357, 359, 360, 356, 214, 231, 265, 264; 249/80, 111, 135

[56] References Cited

U.S. PATENT DOCUMENTS

| | | |
|---|---|---|
| 921,972 | 5/1909 | Gathmann . |
| 941,584 | 11/1909 | McKernan . |
| 1,632,992 | 6/1927 | Bragg . |
| 1,633,028 | 6/1927 | France . |
| 2,683,332 | 7/1954 | Litalien et al. ............... 49/68 |
| 3,024,571 | 3/1962 | Abbott et al. . |
| 3,027,685 | 4/1962 | Cooke ......................... 49/68 |
| 3,070,982 | 1/1963 | McGowan . |
| 3,224,860 | 12/1965 | Stinnes ....................... 65/355 |
| 3,316,074 | 4/1967 | Laurent et al. . |
| 3,318,694 | 5/1967 | Heitmann . |
| 3,617,232 | 11/1971 | Goodwin ..................... 65/267 |
| 3,887,350 | 6/1975 | Jenkins . |
| 3,888,647 | 6/1975 | Breeden et al. ............... 65/29 |
| 3,980,473 | 9/1976 | Costin ......................... 75/171 |
| 4,067,711 | 1/1978 | Jones ......................... 65/319 |
| 4,094,660 | 6/1978 | Ilk . |
| 4,218,243 | 8/1980 | Kiyonaga et al. . |
| 4,367,083 | 1/1983 | Gaul ............................. 65/1 |
| 4,436,544 | 3/1984 | McCausland . |
| 4,497,771 | 2/1985 | Spencer et al. ............ 420/440 |
| 4,555,259 | 11/1985 | Williamson ............ 65/374.12 |
| 4,668,265 | 5/1987 | Gaul et al. ..................... 65/8 |
| 4,708,848 | 11/1987 | Lewis ......................... 420/585 |
| 4,814,024 | 3/1989 | Heetfield ....................... 148/2 |
| 4,820,324 | 4/1989 | Gaul et al. ..................... 65/8 |
| 4,873,674 | 10/1989 | McCausland ........... 65/374.12 |
| 4,904,290 | 2/1990 | Gaul et al. ..................... 65/1 |
| 5,312,473 | 5/1994 | Emrath ....................... 65/267 |
| 5,328,499 | 7/1994 | Poole et al. .................. 75/255 |
| 5,516,352 | 5/1996 | Bogert et al. ................ 65/265 |
| 5,766,299 | 6/1998 | Miller . |

FOREIGN PATENT DOCUMENTS

| | | |
|---|---|---|
| 1696044 | 3/1968 | Germany . |
| 2143869 | 8/1971 | Germany . |
| 2623425 | 5/1976 | Germany . |
| 2813955 | 3/1978 | Germany . |
| 3239095 | 10/1982 | Germany . |
| 4109985 | 3/1991 | Germany . |
| 4118682 | 6/1991 | Germany . |
| 1537837 | 1/1979 | United Kingdom . |

*Primary Examiner*—Steven P. Griffin
*Attorney, Agent, or Firm*—Senniger, Powers, Leavitt & Roedel

[57] ABSTRACT

A mold having a pair of mold halves defining a mold cavity for forming a glass container. There is an inner shell of the mold and an outer shell and a gap therebetween through which cooling gas flows. Heat transfer elements on the inner shell extend laterally outwardly from the inner shell into the gap for contact by cooling gas flowing through the gap thereby to cool the inner shell. The inner shell is formed from a hard material having a working temperature substantially greater than the melting temperature of glass, a heat conductivity of less than about 15 W/m-deg K, and a capability of generating at temperatures in excess of about 500° C. a protective oxide film strongly adhered to the inner shell surface.

17 Claims, 4 Drawing Sheets

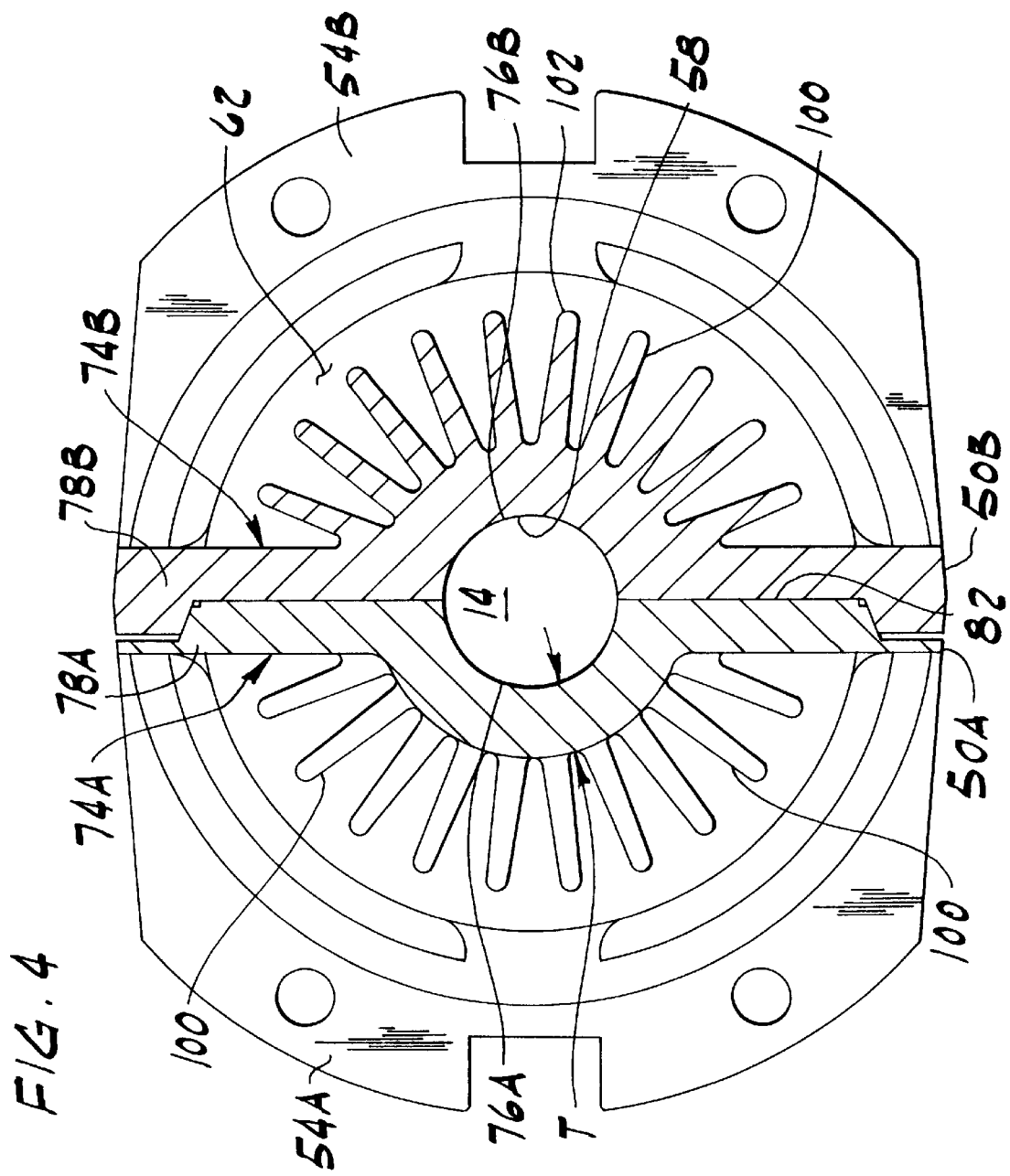

MOLD FOR FORMING GLASSWARE

BACKGROUND OF THE INVENTION

This invention relates generally to molds for forming glassware, such as glass bottles.

Most glassware such as bottles is formed by either a "blow and blow" method or a "press and blow" method. In the blow and blow method, molten glass is introduced into a mold cavity and the interior of the bottle is formed by introducing gas into the molten glass, which gas forces the molten glass against the mold walls to form a rough shape having a cavity. The rough shape is then transferred to a finishing mold where gas pressure is used to force the shape against the mold walls, which imparts final shape to the bottle. The press and blow method is similar, except that a mechanical plunger is used to impart the rough shape having a cavity in the first step of the process. The present invention involves molds for use in the first step of these processes, in which molten glass at a temperature typically in the range of 1050° C. to about 1200° C. contacts the mold.

Conventional split molds for producing glass containers have been made from a gray cast iron, which is a material having high thermal conductivity and moderate wear resistance at temperatures up to about 500° C. However, this material lacks corrosion resistance and is prone to "glass sticking", a phenomenon where the article being molded sticks to the mold surfaces defining the mold cavity. To avoid "glass sticking", these mold surfaces are swabbed with oil or other suitable release material. However, swabbing can result in inclusions and micro cracks in the finished product due to contamination of the mold by the swabbed material, which may reduce the strength of the glass. Also, failure to apply swabbing material uniformly over the mold surfaces can cause temperature discontinuities and non-uniform cooling, which again can result in cracking of the glassware. Still further, the molds become dirty due to swabbing, so that regular cleaning is required.

U.S. Pat. No. 3,888,647 discloses glass container molds made of low alloy nickel-chromium steels. A low alloy nickel-chromium steel is a steel having a total alloying element content less than or equal to about 8%.

Attempts have been made to improve the wear resistance of glass container molds by hardfacing the molding surfaces with nickel-based wear resistant materials. A disadvantage of this approach, however, is that insulating properties of the wear-resistant layer slow the cooling of the mold surface.

There is a need, therefore, for a mold which is constructed to mold high-quality glassware without the need to swab the mold surfaces defining the mold cavity. There is also a need for a mold of increased wear and corrosion resistance, and for a mold which provides more uniform cooling, increased productivity and increased reliability.

SUMMARY OF THE INVENTION

Among the several objects of this invention may be noted the provision of an improved mold capable of producing glassware of high quality having fewer imperfections; the provision of such a mold which is made from a material which eliminates the need to swab the mold surfaces defining the mold cavity; the provision of such a mold wherein the mold surfaces defining the mold cavity are maintained at a substantially uniform temperature to improve the quality of the glassware formed by the mold; the provision of such a mold which provides for enhanced temperature control; the provision of such a mold which has wear resistant molding surfaces for longer mold life; the provision of a mold which has corrosion resistant molding surfaces for longer mold life; and the provision of such a mold which is easy to maintain.

Briefly, therefore, the invention is directed to a mold for forming glassware, comprising a pair of mold halves movable relative to one another from an open position to a closed position in which the mold halves mate with one another to define a mold cavity for molding an article of glass. Each mold half has an inner shell part and an outer shell part. The inner shell parts of the two mold halves are adapted to mate when the mold halves are in closed position to define an inner shell having an inner molding surface defining the mold cavity. The outer shell parts of the two mold halves are adapted to mate when the mold halves are in closed position to form an outer shell spaced laterally outward from the inner shell to define a gap therebetween. There are one or more inlets for the flow of cooling gas into the gap, one or more outlets for the flow of cooling gas out of the gap, and heat transfer elements on the inner shell extending laterally outwardly from the inner shell into the gap for contact by cooling gas flowing through the gap thereby to cool the inner shell. The inner shell is formed from a hard material having a melting temperature substantially greater than the melting temperature of glass, a heat conductivity of less than about 15 W/m-deg K, and a capability of generating at temperatures in excess of about 500° C. a protective oxide film strongly adhered to the inner shell surface.

Other objects and features of this invention will be in part apparent and in part pointed out hereinafter.

BRIEF DESCRIPTION OF THE DRAWINGS

FIG. 4 is a horizontal section taken in the plane of line 4—4 of FIG. 3.

Corresponding parts are designated by corresponding reference numerals throughout the several views of the drawing.

DETAILED DESCRIPTION OF THE PREFERRED EMBODIMENTS

Figure 1:
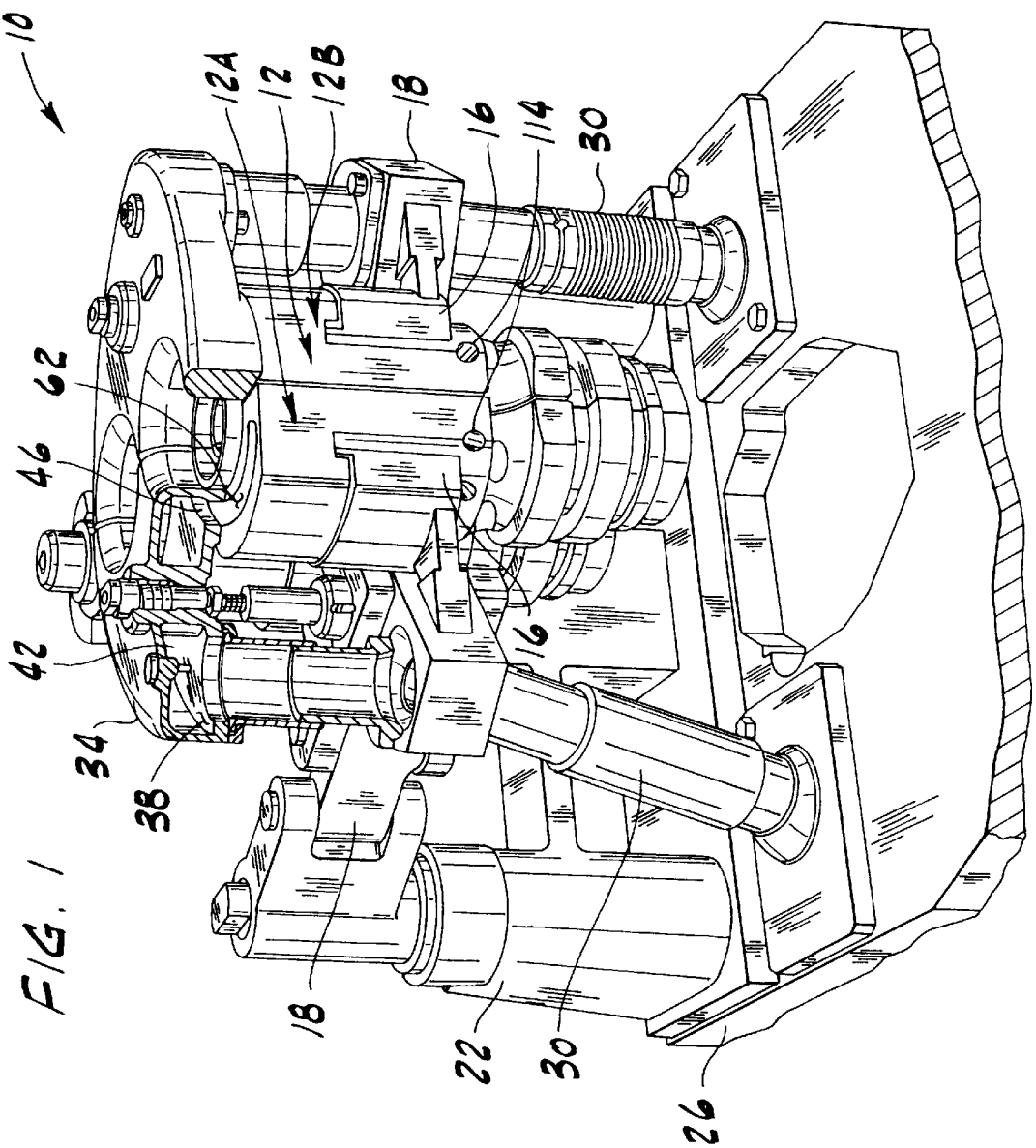
FIG. 1 is a perspective of a glassware forming machine equipped with a mold of this invention.

Referring now to the drawings, and first more particularly to FIG. 1, a glassware forming machine is indicated in its entirety by the reference numeral 10. The machine is equipped with a mold of the present invention, generally designated 12, comprising a pair of mold halves designated 12A and 12B movable relative to one another from an open position to a closed position in which the mold halves mate with one another to define a mold cavity 14 for molding an article of glass, e.g., a bottle. The mold halves 12A, 12B are supported by mold supports 16 on arms 18 pivoted on generally vertical axes for swinging movement of the arms toward and away from one another to move the mold halves between their stated closed position for blow molding of a parison or blank into a finished article of glass, and their stated open position for entry therebetween of glass blanks and for removal of finished articles. The arms 18 are pivoted on vertical columns 22 which extend up from the top of a base 26 of the machine, a suitable mechanism well-known in the art being provided for cyclically swinging the arms 18 open and closed during the glass molding process.

The machine includes a conventional cooling system for delivering cooling gas (e.g., air) to the mold, such as a system sold by Emhart under the trademark "Verti-Flow". As shown in FIG. 1, the system comprises a pair of air ducts 30 extending up from the base 26 of the machine to a plenum member 34 above the mold 12. The plenum member 34 defines a plenum chamber 38 and has a bottom wall 42 with one or more openings 46 therein which communicate with cooling passages in the mold halves 12A, 12B, so that cooling gas flowing up through the ducts 30 enters the plenum chamber and flows into the cooling passages to cool the mold halves, as will be explained in detail hereinafter.

Figure 2:
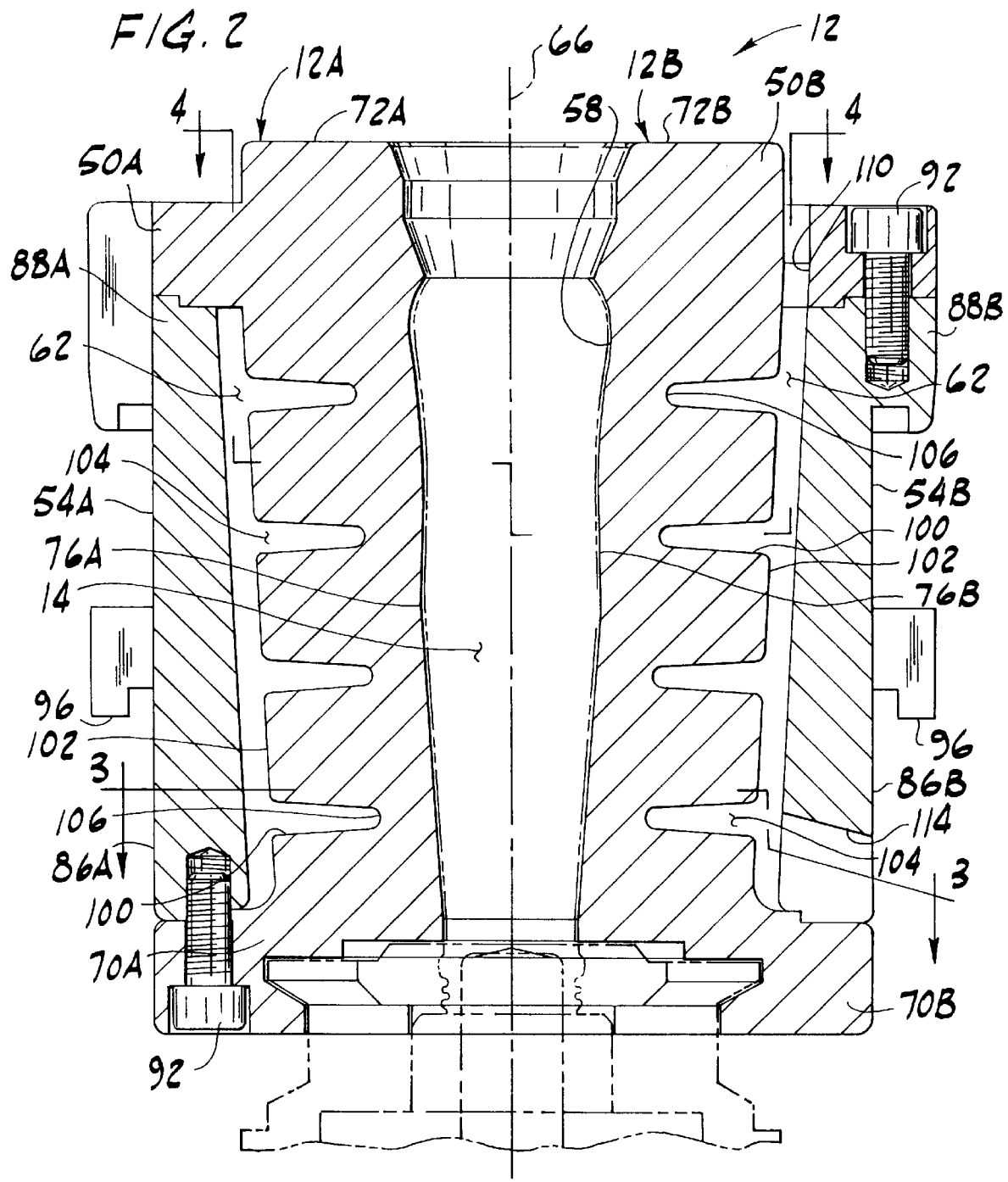
FIG. 2 is a vertical sectional view of the mold.
Figure 3:
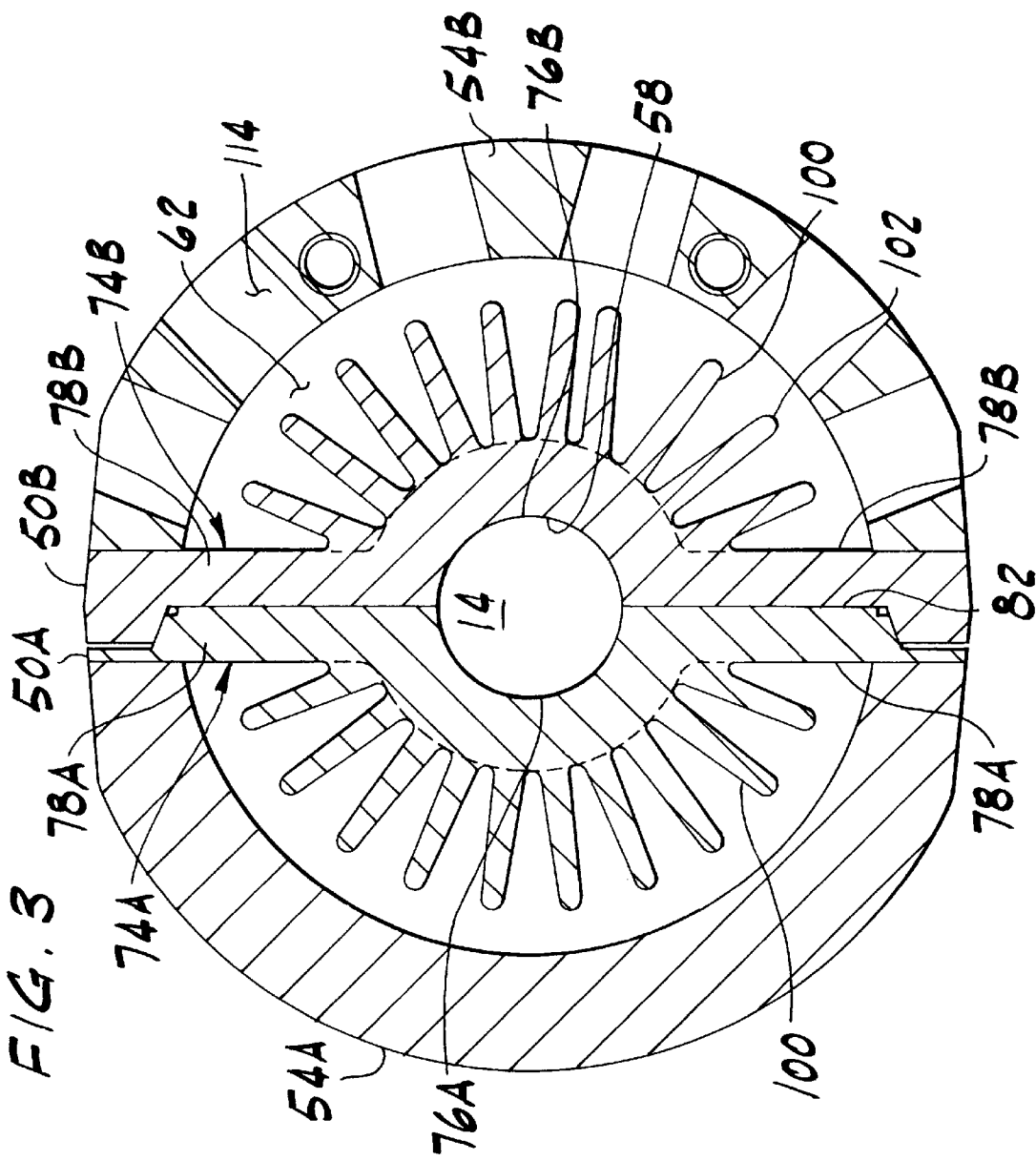
FIG. 3 is a horizontal section taken in the plane of line 3—3 of FIG. 2.

As best illustrated in FIGS. 2–4, each mold half 12A, 12B comprises an inner shell part 50A, 50B and an outer shell part 54A, 54B. The inner shell parts 50A, 50B of the two mold halves 12A, 12B are adapted to mate when the mold halves are in closed position to define an inner shell having an inner molding surface 58 defining the mold cavity 14, and the outer shell parts 54A, 54B of the two mold halves are adapted to mate when the mold halves are in closed position to form an outer shell spaced laterally outward from the inner shell to define a gap 62 therebetween to provide the aforementioned cooling passages for the cooling gas. The mold cavity 14 has a central vertical axis indicated at 66 in FIG. 2.

In the preferred embodiment, the two inner shell parts 50A, 50B are one-piece cast metal parts having mating semi-circular lower ends 70A, 70B, mating semi-circular upper ends 72A, 72B, and mating vertical walls, indicated generally at 74A, 74B, connecting the upper and lower ends. As shown in FIG. 3, a central portion 76A, 76B of each vertical wall 74A, 74B is configured so that its inner surface is generally semi-cylindric to form one-half of the inner molding surface 58 of the mold cavity 14. The outer portions 78A, 78B of each vertical wall 74A, 74B on opposite sides of the central portion 76A, 76B have coplanar inner surfaces which mate along a mold parting line 82 with corresponding surfaces of the opposing inner shell part. The upper ends 72A, 72B and lower ends 70A, 70B of the inner shell parts 50A, 50B are configured for mating with top and bottom mold members (not shown) when the mold halves are closed, as will be understood by those skilled in this art.

The outer shell parts 54A, 54B are preferably one-piece cast metal parts, each being generally semi-cylindric in shape. The outer shell parts 54A, 54B are positioned to extend vertically between the upper ends 72A, 72B and lower ends 70A, 70B of inner shell parts 50A, 50B and are spaced outwardly from the vertical walls 74A, 74B of respective inner shell parts to form the aforementioned gap 62 (FIG. 2). Lower ends 86A, 86B and upper ends 88A, 88B of the outer shell parts 54A, 54B have a close fit with the upper ends 72A, 72B and lower ends 70A, 70B of the inner shell parts 50A, 50B. The inner shell parts 50A, 50B and outer shell parts 54A, 54B are secured together by fasteners 92 extending up through the lower ends 70A, 70B of the inner shell parts 50A, S0B and down through the upper ends 72A, 72B of the inner shell parts. Hangers 96 on the outer shell parts 54A, 54B are used to hang the mold halves 12a, 12B on the mold supports 16.

Each inner shell part 50A, 50B has heat transfer elements extending laterally outwardly from the inner shell parts into the gap 62 between the inner shell parts and the outer shell parts 54A, 54B. As illustrated in FIGS. 3 and 4, these heat transfer elements comprise a plurality of vertical fins 100 radiating out from the central portions 76A, 76B of the vertical walls 74A, 74B of the inner shell parts 50A, 50B. The fins 100 are distributed at substantially equal angular intervals and have outer edges 102 spaced inwardly from the outer shell parts 54A, 54B to allow for the flow of cooling gas between the fins and the outer shell. Each fin 100 also has a series of vertically spaced openings, which in the embodiment shown in the drawings (see FIG. 2) are in the form of notches 104 extending inwardly from the outer edge 102 of the fin to central rounded portions 106 of the inner shell parts 50A, 50B. These notches 104 divide the fin 100 into a series of vertically spaced fin segments, which function to induce turbulent flow in the gap for more efficient cooling. The number and shape of the fins 100 and the number and configuration of the vertical openings in the fins may vary without departing from the scope of this invention so long as they transfer sufficient heat away from the inner molding surface 58 to maintain the temperature of the surface constant and at a level sufficiently low to prevent glass sticking to the surface. The fin arrangement should also be such that the temperature of the inner molding surface 58 is maintained constant over substantially the entire surface of the mold, so that the quality of the molded glass is uniform throughout.

The upper ends 72A, 72B of the inner shell parts 50A, 50B are formed with one or more openings 110 which define one or more inlets for the flow of cooling gas into the gap 62 between the inner and outer shells, and the lower ends 86A, 86B of the outer shell parts 54A, 54B are formed with one or more openings 114 which define one or more outlets for the flow of cooling gas out of the gap. The cooling gas flowing down through the gap 62 cools the heat transfer fins 100 and the inner shell parts 50A, 50B to transfer the necessary heat away from the inner molding surface 58. It will be understood that the flow of cooling gas could be reversed to move upwardly through the gap 62 without departing from the scope of this invention. Cooling gas is delivered to the gap 62 at a temperature of about 25° C. and at a pressure of about 0.12–0.15 bar, for example.

In accordance with this invention, the material from which the inner shell of the mold is constructed has a heat conductivity of less than about 15 W/m-deg K, preferably in the range of about 8 to 15 W/m-deg K, and more preferably less than about 12 W/m-deg K. One preferred embodiment has a thermal conductivity in the range of about 10 to 12 W/m-deg K. This conductivity is substantially less than traditional mold materials, such as gray cast iron, which has a conductivity of about 32 W/m-deg K. The primary reason for using materials with relatively low conductivity is to help maintain a constant temperature over the inner molding surface for consistent cooling of the molten glass. With mold materials having a relatively higher thermal conductivity, there is often an increase in the occurrence of non-uniform temperatures at different locations in the mold, which can induce cracking. Higher thermal conductivity material also often corresponds to the occurrence of non-uniform mold surface temperatures from one bottle to the next, which reduces reliability and consistency. The increased uniformity of temperature resulting from a lower thermal conductivity therefore enhances reliability and consistency.

One might preliminarily conclude that using a material of lower heat conductivity would be disadvantageous, because it would slow the cooling process, and thus increase the time it takes to cool and eject each glass container from the mold. However, the increased strength, and especially the enhanced corrosion resistance, of the material used in the invention, as compared to, for example, gray cast iron, allows the use of a much thinner container mold wall, such that rapid cooling is achieved despite the lower thermal conductivity of the wall material.

The mold wall thickness T (FIG. 4) of the inner shell is less than about 15 mm, preferably in the range of about 10 to 15 mm. In contrast, the mold wall thickness of conventional gray cast iron container molds is typically on the order of 3.5 to 6 times as thick; specifically, on the order of 50 to 60 mm.

Therefore, the concept behind the mold of the present invention, i.e., a relatively thin mold wall of a material having a relatively low thermal conductivity, differs fundamentally from the prior approach, i.e., a relatively thick mold wall of a material having a relatively high thermal conductivity. The thinner wall allows the system to cool faster because for heat to be drawn away from the molten glass and dissipated it must travel a shorter distance with a thinner wall than with a thicker wall. And due to this thinner wall, the system is more responsive to external temperature control. The thinner wall increases the cooling rate more than the lower thermal conductivity decreases the cooling rate, such that the overall effect is an increase in cooling rate.

corrosion resistance of the mold materials. Furthermore, productivity is increased as more containers per hour can be processed.

The material from which the inner shell of the mold is constructed has a melting temperature substantially greater than the working temperature of the glass being molded, and has relatively high wear and corrosion resistance at high temperatures involved in the molding process. The preferred material has a hardness of at least about 20 Rockwell C ($R_c$), preferably in the range of about 20 to 60 $R_c$, and more preferably in the range of about 30 to 60 $R_c$. One preferred embodiment has a hardness of about 35 $R_c$.

Certain preferred embodiments of the inner shell of the invention are constructed from cobalt-based alloys, others from nickel-based alloys, and others from iron-based alloys. Particularly preferred embodiments are formed from the following alloys:

TABLE I

| Alloy | Conductivity | Co | Ni | Fe | Cr | W | Mo | Si | C | Other | Unified Num. Sys. Designation |
|---|---|---|---|---|---|---|---|---|---|---|---|
| 33 | 8.4 | Rem | — | — | 33 | 17 | — | 0.75 | 2.3 | — | — |
| 230 | 8.9 | — | Rem | — | 22 | 14 | 2.0 | 0.4 | 0.01 | Al 0.3 La 0.02 | N06230 |
| 250 | 9.1 | Rem | — | 21 | 28 | — | — | 0.75 | 0.10 | Mn 0.75 | — |
| 25 | 9.8 | Rem | 10 | — | 20 | 15 | — | — | 0.10 | — | R30605 |
| 625 | 9.8 | — | Rem | — | 21 | — | 9.0 | — | 0.05 | Nb3.7 | N06625 |
| 188 | 10.8 | Rem | 22 | — | 22 | 14 | — | 0.35 | 0.10 | La 0.03 | R30188 |
| 93 | 11.3 | 6.3 | — | Rem | 18 | — | 16 | 0.9 | 3.3 | V 2 | — |
| T-700 | 11.4 | — | Rem | — | 16 | — | 33 | 3.4 | 0.04 | — | — |
| 718 | 11.4 | — | Rem | 19 | 18 | — | 3.0 | — | 0.05 | Nb 5.0 | N07718 |

The mold material of which the inner shell is made preferably generates at temperatures in excess of about 500° C. a protective oxide film resistant to the adhesion of molten glass thereto. The thickness of this oxide film is typically at least about 5 microns thick. It is important that this film have a relatively uniform thickness and consistent topography. This film serves to protect the mold from wear and corrosion, and to prevent sticking of the glass to the inner molding surface 58 of the mold 12. One preferred embodiment of the invention achieves the desired oxide film by employing a mold material having a chromium content of at least about 15% by weight, preferably of between about 15 and 35% by weight, and more preferably of between about 16 and 33% by weight. The film formed in accordance with this invention is a tenacious, strongly adherent film which remains adhered to the mold surface during service. Any oxide film which forms on gray cast iron, in contrast, is relatively porous and non-adherent.

The inner shell mold material is selected such that in service it has a glass sticking temperature in the range of about 700 to 750° C., as compared to about 600 to 630° C. for gray cast iron. As such, the glass container being molded only needs to be cooled into the range of about 700 to 750° C. before it can safely be ejected from the mold without sticking, thus reducing processing time and increasing productivity. Tests have shown that a mold constructed from gray cast iron requires about 25 seconds to form a glass container whereas a mold constructed from alloy T-700 (See Table I) requires less than about 20 seconds. The life of the mold is therefore increased due to the reduced contact time with the glass, as well as due to the improved wear and The iron-based alloys used in connection with the inner shell of the mold (e.g., Alloy 93 from Table I) are distinct from the gray cast iron and low alloy nickel-chromium steels conventionally used in glass container molds in that they contain relatively high contents of alloying elements, in particular, at least about 30% by weight alloying elements selected from the group consisting of Cr, Co, w, Si and Mo and, in one preferred embodiment, more than about 40% by weight alloying elements. The nickel-based alloys used in connection with the inner shell of the mold (e.g., Alloys 230, 625, T-700 and 718) contain at least about 40% by weight nickel. The cobalt-based alloys used in connection with the mold inner shell of the invention (e.g., Alloys 33, 250, 25, and 188) contain at least about 38% cobalt by weight and preferably 43% cobalt by weight. The exceptional wear and corrosion resistance of selected high alloy steels, nickel-based alloys, and cobalt based alloys at high temperatures provides prolonged mold life.

The mold outer shell is preferably made from the same material as the mold inner shell, but the mold outer shell material is not especially critical because it does not contact molten glass.

As various changes could be made in the above embodiments without departing from the scope of the invention, it is intended that all matter contained in the above description shall be interpreted as illustrative and not in a limiting sense.

We claim:

1. A mold for forming glassware, comprising
   a pair of mold halves movable relative to one another from an open position to a closed position in which the mold halves mate with one another to define a mold cavity for molding an article of glass, said mold cavity having a vertical axis, each mold half comprising an inner shell part and an outer shell part, the inner shell parts of the two mold halves being constructed and arranged to mate when the mold halves are in the closed position to define an inner shell having an inner molding surface defining said mold cavity, and the outer shell parts of the two mold halves being constructed and arranged to mate when the mold halves are in the closed position to form an outer shell spaced laterally outward from the inner shell to define a gap therebetween, one or more inlets for the flow of cooling gas into the gap, one or more outlets for the flow of cooling gas out of the gap, and heat transfer elements on the inner shell extending laterally outwardly from the inner shell into the gap for contact by cooling gas flowing through the gap thereby to cool the inner shell, the inner shell being formed from a hard material having a melting temperature substantially greater than the working temperature of glass, a heat conductivity of less than about 15 W/m-deg K, and a capability of generating at temperatures in excess of about 500° C. a protective oxide film strongly adhered to the inner molding surface.

2. A mold as set forth in claim 1 wherein said heat transfer elements are substantially equally distributed around the inner shell to maintain the inner molding surface of the shell at a substantially uniform temperature during the molding process.

3. A mold as set forth in claim 2 wherein said heat transfer elements comprise a plurality of fins on the inner shell.

4. A mold as set forth in claim 3 wherein each of said fins has an outer edge spaced inwardly from the outer shell to allow for flow of cooling gas between the fin and the outer shell.

5. A mold as set forth in claim 4 wherein said fins lie in vertical planes radiating out from the inner shell.

6. A mold as set forth in claim 5 wherein each fin has a series of vertically spaced openings therein to allow for the flow of cooling gas therethrough.

7. A mold as set forth in claim 6 wherein said openings are notches extending inwardly from an outer edge of each fin, said notches dividing the fin into a series of vertically spaced fin segments.

8. A mold as set forth in claim 4 wherein the outer shell has upper and lower ends, and wherein said one or more inlets are adjacent the upper end of the outer shell and said one or more outlets are adjacent the lower end of the outer shell, the flow of cooling gas being in a downward direction through said gap.

9. A mold as set forth in claim 1 wherein the inner shell is constructed from an iron-based alloy comprising at least about 30% by weight alloying elements selected from the group consisting of Cr, Co, W, Si and Mo.

10. A mold as set forth in claim 1 wherein the inner shell is constructed from an alloy comprising at least about 40% by weight nickel.

11. A mold as set forth in claim 1 wherein the inner shell is constructed from an alloy comprising at least about 43% by weight cobalt.

12. A mold as set forth in claim 1 wherein the inner shell is constructed from an alloy comprising at least about 15% by weight chromium.

13. A mold as set forth in claim 12 wherein the inner shell is constructed from an alloy comprising between about 16 and 33% by weight chromium.

14. A mold as set forth in claim 1 wherein the inner shell is formed from a material having a heat conductivity in the range of about 8 to about 15 W/m-deg K.

15. A mold as set forth in claim 14 wherein the inner shell is formed from a material having a heat conductivity in the range of about 10 to 12 W/m-deg K.

16. A mold as set forth in claim 1 wherein the average cross-sectional thickness of the inner shell part is in the range of between about 10 mm and about 15 mm.

17. A mold for forming glassware, comprising a pair of mold halves movable relative to one another from an open position to a closed position in which the mold halves mate with one another to define a mold cavity for molding an article of glass, said mold cavity having a vertical axis, each mold half comprising an inner shell part and an outer shell part, the inner shell parts of the two mold halves being constructed and arranged to mate when the mold halves are in the closed position to define an inner shell having an inner molding surface defining said mold cavity, and the outer shell parts of the two mold halves being contructed and arranged to mate when the mold halves are in the closed position to form an outer shell spaced laterally outward from the inner shell to define a gap therebeween, one or more inlets for the flow of cooling gas into the gap, one or more outlets for the flow of cooling gas out of the gap, heat transfer elements on the inner shell extending laterally outwardly from the inner shell into the gap for contact by cooling gas flowing through the gap thereby to cool the inner shell, the inner shell being formed from a hard material having a melting temperature substantially greater than the working temperature of glass, a chromium content in the range of about 16 to about 33% by weight, a heat conductivity of less than about 15 W/m-deg K, and a capability of generating at temperatures in excess of about 500° C. a protective oxide film strongly adhered to the inner shell surface, and the inner shell having an average cross-sectional thickness in the range of between about 10 mm and about 15 mm.

* * * * *